Figure 1:
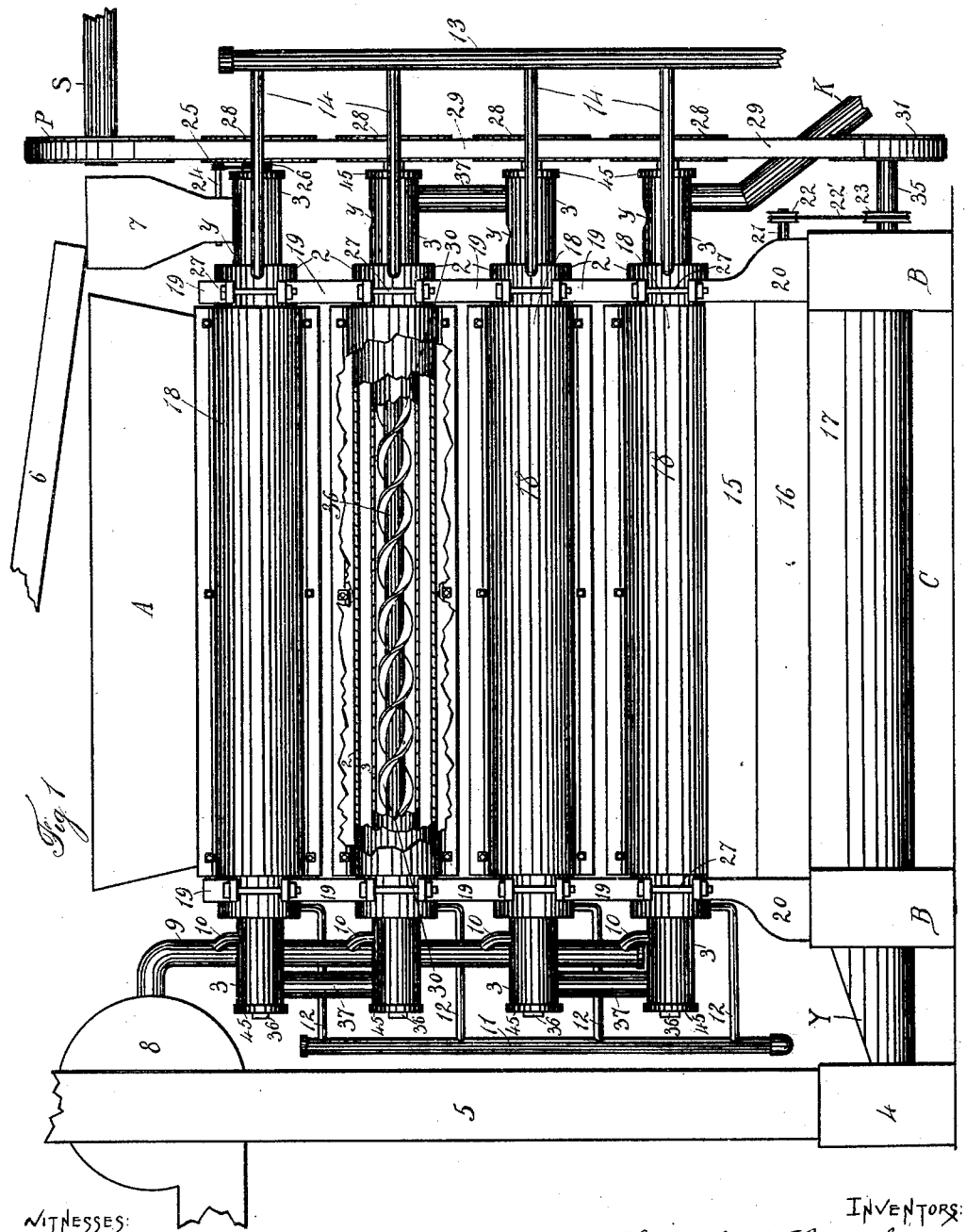

No. 674,040. Patented May 14, 1901.
S. B. SAMUELSON & C. P. ANDERSON.
GRAIN DRIER.
(Application filed Jan. 26, 1900.)
(No Model.) 2 Sheets—Sheet 1.

WITNESSES:
C. F. Patterson
M. Q. Dodsworth

INVENTORS:
Samuel B. Samuelson
Charles P. Anderson
PER Geo. W. Sues
ATTORNEY.

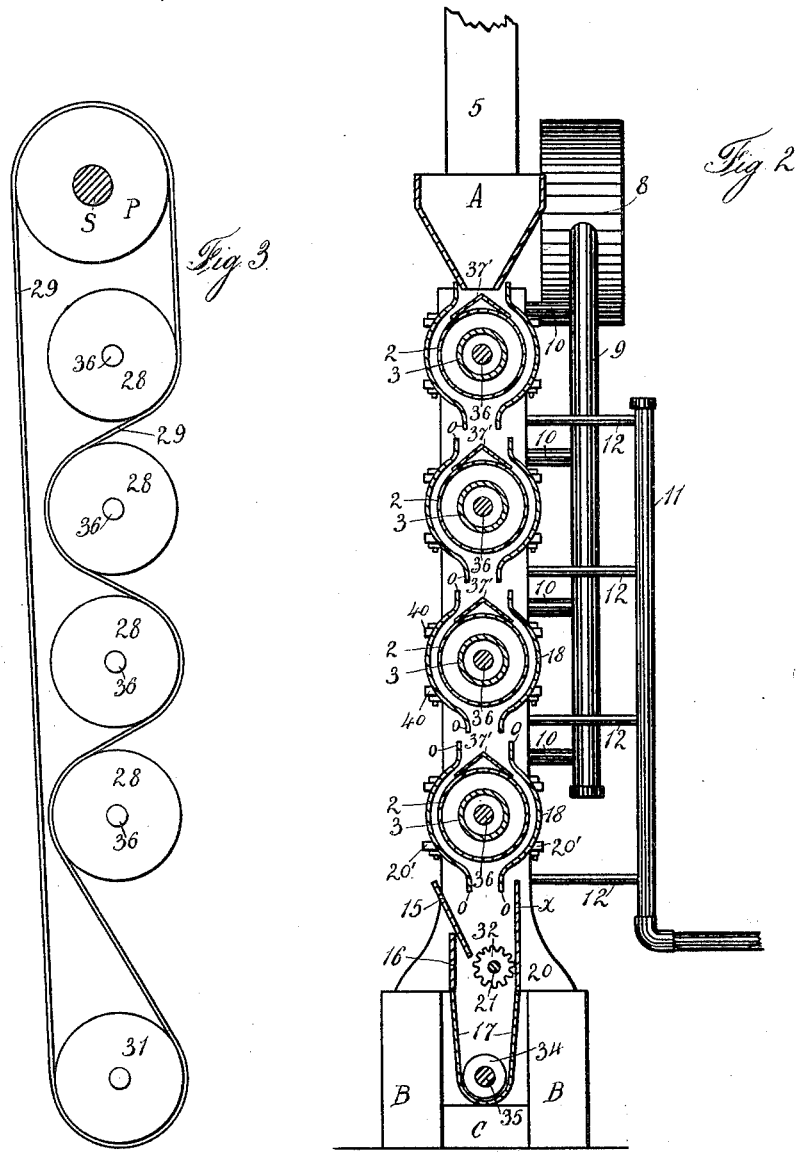

UNITED STATES PATENT OFFICE.

SAMUEL B. SAMUELSON AND CHARLES P. ANDERSON, OF STROMSBURG, NEBRASKA.

GRAIN-DRIER.

SPECIFICATION forming part of Letters Patent No. 674,040, dated May 14, 1901.

Application filed January 26, 1900. Serial No. 2,836. (No model.)

*To all whom it may concern:*

Be it known that we, SAMUEL B. SAMUELSON and CHARLES P. ANDERSON, residing at Stromsburg, in the county of Polk and State of Nebraska, have invented certain useful Improvements in Grain-Driers; and we do hereby declare that the following is a full, clear, and exact description thereof, such as will enable others skilled in the art to which it appertains to make and use the same, reference being had to the accompanying drawings, which form a part of this specification.

This invention relates to an improvement in grain-driers.

Our invention relates more particularly to that class of grain-driers in which a plurality or battery of steam-heated pipes are employed.

It consists in various features of construction hereinafter specifically described and claimed, having reference more particularly to the means for drying the grain, which is made to pass over, as well as through, a heated drier so arranged as to bring out the most economic and practical results.

In the accompanying drawings we have shown in Figure 1 a side elevation, with portions broken away, of a grain-drier embodying our invention. Fig. 2 shows a vertical cross-sectional view disclosing the arrangement of the superposed driers with portions broken away. Fig. 3 is an end view disclosing the disposition of the driving-belt.

Our invention embodies, essentially, a suitable frame or base comprising the uprights B B, within which is held a trough 17, one edge or upward extension $x$ of which preferably extends beyond the other, as is shown in Fig. 3, and an upper hopper A. Within this lower trough 17 and near the bottom thereof is a shaft 35, provided with a spirally-disposed flange 34, which flange acts as a feeder to feed the material that is dropped into this trough, toward one end thereof. Near the upper end, within this trough 17, is the preferably-reeded cylinder 32, mounted upon an axle 21, and upon one side is a sliding board 15, which can be brought against or away from this reeded cylinder, which cylinder upon the opposite side works adjacent and preferably in contact with the trough extension $x$, so that the grain which is feed into this trough and falls upon this reeded cylinder may be fed into the trough at any desirable speed. The larger the distance between the slide 15 and the reeded cylinder 32 the more quickly will the grain feed through the same. In order to rotate this reeded cylinder, which we term a "feed-roll," we provide the shaft 21 with a sheave 22, as shown in Fig. 1, over which the belt 22' passes, working over a sheave 23 upon the shaft 35 of the lower feed-roll.

Extending upward from the uprights B, which are united by means of the sill C, are the lower bolsters 20, which are provided with the ears 20' and which bolsters are adapted to receive the tubes 2. Referring now to Fig. 1, it will be noticed that the tube 2 rests upon the bolsters 20 20 and that an intermediate bolster 19, provided with two seatings, is secured to the ears of the lower bolster by means of the bolts 27. These tubes 2 are used in superposed batteries, as is shown, and each being separated from the adjacent one by means of one of these bolsters 19, which are provided with the projecting ears 40, so that they can be readily united by means of bolts 27.

Surrounding each of the tubes 2 are two counterpart and approximately semicircular shells 18, as shown more clearly in Fig. 3, each shell being provided with a projecting flange O. These open-ended shells have their ends closed and are provided with an upper and lower opening. In referring to Fig. 3 it will be noticed that the opening between the upper projecting flanges O and the downwardly-projecting flanges of the shells above always terminate a suitable distance above the upper termination of the upper flanges of the lower shells, so that a clear open space is provided between each of the superposed shells. These counterpart shells are further semicircular, so that they provide a space of equal distance around each of the tubes 2, as clearly shown in Fig. 3. Each of these tubes 2 is provided above with the deflector 37', so that the grain dropping from the shell above will not be adapted to rest upon the circular upper portion of the tubes 2.

Passing through each tube 2 is an iron pipe 3 of a diameter less than the tube 2. The diameter or capacity of this pipe 3 is so regulated that it approximates and is equal to the capacity or space between the shells 18 and the tube 2. This is done so that the material, which at one time passes between the tube 2 and shells 18 and afterward through the tube 3, will not clog and may be continuously fed without interruption. These tubes 3, it will be noticed, at each end project a suitable distance beyond the tubes 2, and that the lower tube 3, referring now to Fig. 1, is connected at one end to the upper tube by means of the pipe 37, and this pipe 37 in turn, by means of the similar pipe 37, is connected to the tube 3 above, and to this similar tube again by means of the small pipe 37 is again connected to the top or highest tube 3, as clearly shown in Fig. 1.

Passing through each of the end caps 45 is a shaft 36, supported within these caps 45, and at one end these shafts project and are provided each with a pulley 28, as clearly shown.

Extending from the lowest tube 3 is an exit-duct K, as is shown. Now it will be noticed that each of these tubes 3 is provided with a spiral feeding-flange 30; but it should be remembered that these feeding-flanges are revolved in opposite directions alternately, so that, referring now to Fig. 1, the upper spiral would feed toward the elevator 5, the next lowest toward the belt 29, the next lowest toward the elevator again, and the lowest again toward the belt 29. In order to bring about the proper rotation of these shafts 36, the driving-belt 29 is made to pass alternately from side to side, as is shown at Fig. 2, the belt passing over the main driving-pulley P being secured to the main drive-shaft S.

The steam is conducted into the pipes 2, so that the space between these pipes and the tubes 3 forms a steam-chamber, the supply-pipe 13 being provided with the branch 14, leading into these pipes, as is shown in Fig. 1. To insure a proper circulation, the pipe 11, upon the opposite side, is provided with the branches 12, also leading into these tubes 2, insuring a free circulation of the steam.

Now the operation of my device would be as follows: The steam having been admitted into the tubes 2 to raise the temperature of these tubes, the grain would be fed into the hopper A by any suitable means and then successively pass around the shells 18 into the succeeding drier until it finally reached the lower roll 32, when it would gradually lodge and slowly bank up and interrupt and choke up the full series of shells, so that we would have a solid column of grain from the hopper A down to and resting upon the feed-roll 32. Because of the lower flanges O being nearer together than the flanges below it the grain will angle upward and not escape out of the shells offering a certain amount of their surface to the open air. The time that the grain is made to circulate about the outside of the tubes 2 is determined by the speed of the roller 32 and the position of the valve 15, which, as has been described, is in the form of a flat board suitably held between the bolsters 20 20. Now as the grain drops from the feed-roller 32 into the lower trough 17 it is fed toward the Y end thereof into the keeper 4, within which is an ordinary endless elevator cup system as is usual in mills, and through this leg 5 the grain is fed upward in the cups into the chute 6, as is shown in Fig. 1, down which it slides into the hopper 7, so that it enters the upper or highermost-positioned tube 3, where it is fed through the tube over which it previously passed toward the opposite end, then upward through the vertical communicating branch 37, then toward the opposite end again, and so moves backward and forward until it finally escapes out of the tube K into any suitable receptacle. From this it will be noticed that we use both the outer surface and inner surface of two nested tubes forming a heating-jacket.

In order to remove the sweat accumulated within the tubes 2, we connect them to an ordinary exhaust-fan 8, which is provided with a main tube 9, from which extend the branches 10, which enter the tubes 3, these tubes 3 being provided with openings y at their opposite ends to permit the ingress of fresh air. This also insures the carrying off of all the dust and lighter impurities.

It is of course understood that these driers could be made of any number of superposed hollow heated feeders, and they could be used side by side in batteries and simply connected by means of elevators.

Having thus described our said invention, what we claim as new, and desire to secure by United States Letters Patent, is—

1. In a grain-drier the combination with a hollow cylinder, of a hopper above said cylinder, a shell communicating with said hopper surrounding said cylinder and provided with an exit-opening, and an elevator communicating with said exit-opening and hollow cylinder, as and for the purpose set forth.

2. The combination with a steam-holder provided with an interior chamber, of a hopper above said steam-holder, a shell communicating with said hopper and surrounding said steam-holder provided below with an exit-opening, a receiving-trough, an elevator communicating with said receiving-trough, and an escape-duct extending from said interior chamber.

3. The combination with a suitable standard, of a plurality of superposed housings provided with interior chambers, a plurality of counterpart shells forming jackets surrounding said housings, each shell having an intake and exit opening, said shells successively communicating with one another, a hopper communicating with the intake-opening of the uppermost shell, a conveyer within each of said interior chambers, mechanism to rotate said conveyers, said conveyers being arranged to feed successively in reverse order, ducts successively uniting interior chambers at opposite ends, an intake-hopper communicating with the uppermost interior chamber, an exit-spout extending from the lowermost interior chamber, a receiving-trough and an elevator communicating with said lowermost shell and said receiving-trough.

4. The combination with a suitable standard, of a plurality of superposed housings provided with interior chambers, a plurality of counterpart shells forming jackets surrounding said housings, each shell having an intake and exit opening, said shells successively communicating with one another, a hopper communicating with the intake-opening of the uppermost shell, a conveyer within each of said interior chambers, mechanism to rotate said conveyers, said conveyers being arranged to feed successively in reverse order, ducts successively uniting said interior chambers at opposite ends, an intake-hopper communicating with the uppermost interior chamber, an exit-spout extending from the lowermost interior chamber, an elevator extending from the exit-opening of said lowermost shell and communicating with the hopper extending from said uppermost interior chamber, a trough communicating with the exit-opening within said lowermost shell, a valve within said trough, and an elevator communicating with said trough and with said hopper extending from the interior chamber of said uppermost cylinder as and for the purpose set forth.

Signed in the presence of two witnesses.

SAMUEL B. SAMUELSON.
CHARLES P. ANDERSON.

Witnesses:
JOHN JANQUERT,
NAT ANDERSON.